Nov. 23, 1954     A. F. HOFF     2,695,237
ICE-CREAM CONFECTION
Filed Jan. 3, 1950
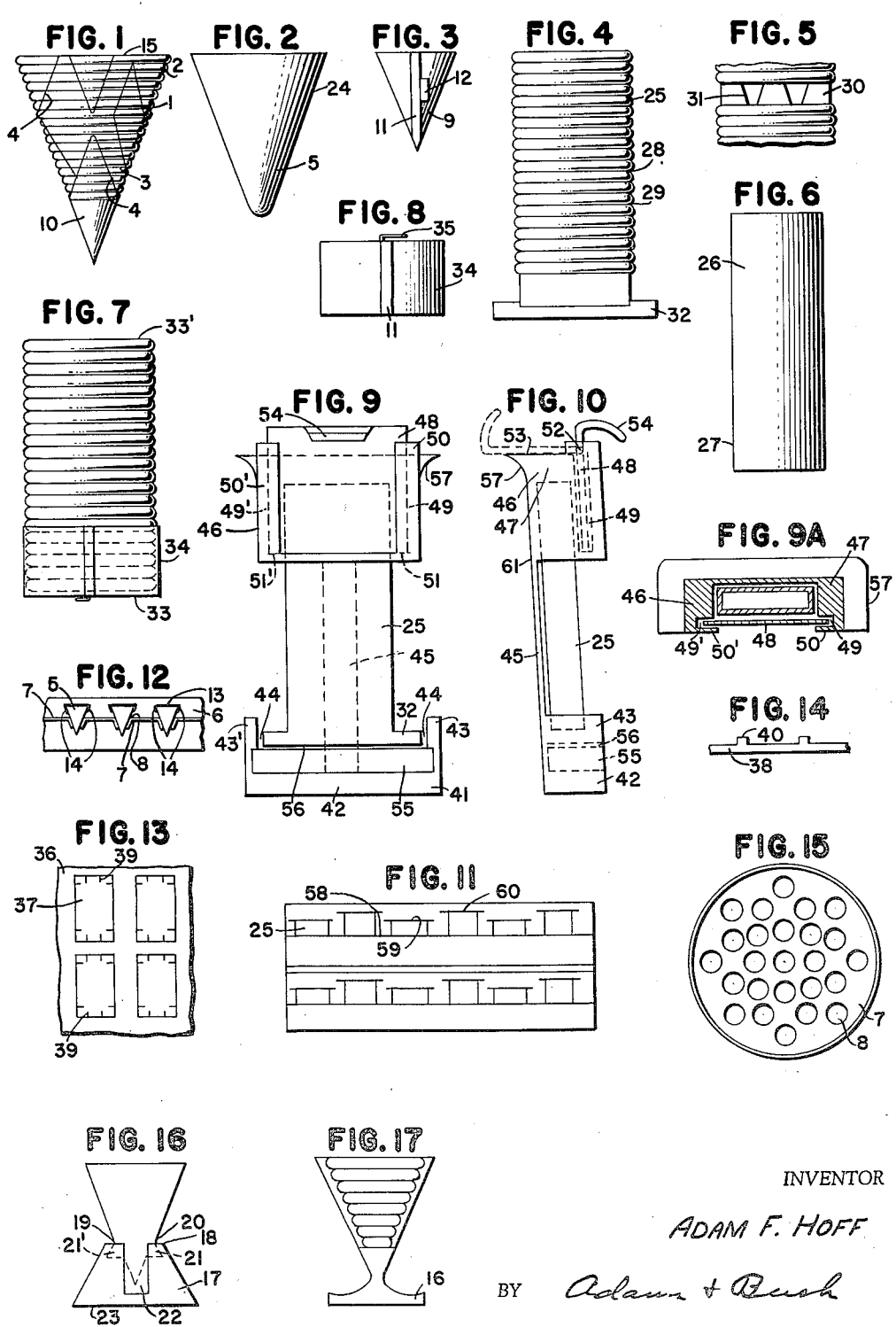
INVENTOR
ADAM F. HOFF
BY Adam & Bush
ATTORNEY

United States Patent Office 2,695,237
Patented Nov. 23, 1954

2,695,237

ICE-CREAM CONFECTION

Adam F. Hoff, Baltimore, Md.

Application January 3, 1950, Serial No. 136,433

2 Claims. (Cl. 99—137)

My invention pertains to an ice cream confection.

The main object of the invention is to provide a readily prepared ice cream, or similarly liquid frozen confection unit, adapted to be inserted into a flour baked cone or flour baked edible container, and when so inserted, the ice cream unit to fit neatly within the housing, without breaking the housing in the process of insertion, and without the ice cream unit wabbling within the housing during its process of consumption.

Another object of the invention is to coat the ice cream, or similarly frozen confection unit, with a hardened candy, chocolate, or other edible coating adapted not to melt under room temperature, thereby adding both, an additional flavor element to the confection and preventing otherwise the ice cream from melting during its process of being consumed.

Another object of the invention is to provide the outside edible container either in the form of the commonly used coned shape edible, or of a tubular or angular shaped housing, with the ends either open or closed.

Another object of the invention is to provide one end of either the cone or edible housing with a resting surface so that the ice cream confection can be made to rest on a flat surface, such as a table, with the eaten ice cream end on top, during its process of being consumed.

Another object of the invention is to pack the readily prepared ice cream unit so that it can be lifted out of the package and inserted in the outside edible container without being touched by the hand of the user, thereby preserving its sanitary handling. As a further sanitary precaution, provision is also made to envelop the outside edible housing with a removable member so as to avoid the hand of the user to come in direct contact with the housing during the dispensing process or when being consumed.

Another object of the invention is to provide the outside walls of the edible housing with weakened areas calculated for the confection to break at the weakened areas when being consumed, thereby preventing any melted ice cream from running over on the outside wall of the confection and soil any contacting surface.

Another object of the invention is to provide means to insert automatically the ice cream unit into the housing, without breaking it.

Another object of the invention is to provide means that will hold the packed ice cream units in their packaged containers, without the ice cream units sticking to the walls of the containers or otherwise becoming misplaced.

The details of the invention are more apparent from the following specification and appended drawing, where Figure 1 illustrates a front plan view of a cone containing ice cream.

Figure 2 illustrates a front plan view of a readily prepared ice cream unit adapted to be inserted into a coned housing.

Figure 3 illustrates a front plan view of a sanitary holding member of an ice cream cone.

Figure 4 illustrates a front plan view of an edible cake housing containing ice cream.

Figure 5 illustrates a sectional front plan view of an edible housing as shown in Figure 4, of modified weakened areas on the walls of the housing.

Figure 6 illustrates a front plan view of a readily prepared ice cream unit adapted to be inserted into the edible housings shown in Figures 4 and 5.

Figure 7 illustrates a front plan view of a modified edible housing as shown in Figure 4.

Figure 8 illustrates a front plan view of a container holding member of edible housings shown in Figures 4, 5, and 7.

Figure 9 illustrates a front plan view of a dispenser adapted to insert automatically the readily prepared ice cream unit into an edible housing, without breaking the housings as shown in Figures 4 to 7 inclusive. Fig 9A is a cross section of Figure 9, taken on the dotted line A—A'.

Figure 10 illustrates a side plan view of the dispenser shown in Fig. 9.

Figure 11 illustrates an exposed front plan view of a container that houses a number of edible housings for readily prepared ice cream units.

Figure 12 illustrates an exposed front-plan view of a container that houses a number of readily prepared ice cream coned units.

Figure 13 illustrates a top plan view of a holding plate adapted to house a number of readily prepared ice cream units as shown in Figure 6.

Figure 14 illustrates a side plan view of a bottom plate of a container adapted to house a number of confections shown in Figs. 11 and 13.

Figure 15 illustrates a top plan view of a plate of a container adapted to hold a number of ice cream readily prepared units preparatory to their being inserted in ice cream cones.

Figure 16 illustrates a front plan view of a removably detachable member adapted to hold an ice cream cone in a resting position during its process of being consumed.

Figure 17 illustrates a front plan view of an ice cream cone with a resting base, adapting the cone to rest on a surface during its process of being consumed.

Referring to the drawing, 1 represents an ice cream cone of the shape and type commonly in use, except that I prefer providing the outside walls with ringed projections 2 and recesses 3, with the ringed projections and recesses being in such proximity to each other that the bitten portions of the cone and the ice cream will be bitten off at the defined recesses regardless of the size of chunk bitten off from the cone, and so prevent any melted ice cream from running over the walls of the cone or any of the melted ice cream soiling the hands of the user or any other contacting surface. Furthermore, while the ringed projections and recesses will tend to break the cone horizontally, the cross recesses 4 will tend to break the cone vertically at the defined vertical areas, and so confine the breaking of the cone during consumption, both vertically and horizontally. The cone housing just referred to can be made of any desired edible consistency and preferably with flour as a base ingredient. While referring to the filling as being made of ice cream, it can be also of any other frozen edible consistency, such as sherbet, custard, etc., with the filling being also mixed, if desired, with different other flavored edibles such as chocolate, nut, mint and other chips.

5 represents readily prepared frozen cuts of ice cream or other frozen edibles, and are preferably made of a conical shape, but of a smaller diameter than the orifice of the cone housing, and adapted to be inserted, as a unit, into the cone before being served. Although, if desired, the fillings may be made in the form of balls as now commonly used in connection with cones.

The advantages of using the fillings of the cones in predetermined readily prepared cuts, instead of the present customary usage of dipping an ice cream dipper into a can, scooping out a ball of ice cream and filling it into a cone, reside in both, being more sanitary and affording more expediency in handling. At present when the dipper is kept in a water container and changed constantly from the container into the ice cream and back again, the process is very unsanitary and repulsive to the eye, since it serves as a breeding source for bacteria, dirt, and uncleanliness, aside from the filthy water in the container proving rather annoying.

My method, however, of providing readily prepared cuts for the cone fillings, together with the suggested method of packaging them, as further explained, do away with these objections, thereby affording a definitely improved article of manufacture.

Accordingly, 6 represents a container having decks 7 with the perforations 8 in the decks serving to hold the readily prepared frozen fillings 5 before being served, with 8' being rib extensions to hold the fillings in place and also to prevent their sticking to the walls of the decks.

As a further sanitary precaution, I provide a removably detachable flexible holder, preferably made of paper, 9, shaped to conform to the lower conical shape of the cone 10, by glueing, or otherwise fastening, its ends 11. To afford the easy and ready handling of the holders, I provide a gripping extension 12, so that when they are stacked upon each other, each holder can be easily picked off the pile by getting hold of the extension member.

In practice, the server picks off a holding member, inserts it at the bottom of the cone. Then gets hold of a strip of paper, not shown, from another pile, covers the top 13 of the filling, and by bending the paper strip over the side wall 14, lifts out the frozen filling from the container and inserts it into the orifice of the cone 15, thereby touching directly, neither the frozen filling nor the cone. The method just described adds also expediency of dispensing the cones, by saving the dipping out of the can an ice cream scoop and washing the dipper each time a cone is being served.

To provide further a leisurely way of eating ice cream cones, instead of the present way when the entire cone must be consumed at one time, I terminate the bottom of the cone with a resting base 16 of any desired contour, shape, and support to suit best a given instance. On the other hand, if under certain circumstances, it proves inexpedient to make the base an integral part of the cone proper, I provide further a removably detachable flexible base member, 17, made say of paper, and tapering upwardly, as 18, and ending with a peripheral opening 19 to hug a predetermined diameter of the cone, as at 20, and provide opposite extensions 21 and 21' as part of the cone, and provide a slot 22 in the holding member, that is adapted to pass through the extensions 21 and 21' sideways, and by twisting the base member away from the extentions, the base member will hug tightly the cone that can then be made to stand upwardly on the bottom 23, so that the cone can be eaten leisurely and made to rest, say on the table, during its process of being consumed.

In connection with the readily prepared frozen cuts of ice cream, sherbet and the like referred to above, the consistency of the cuts may be either the same throughout, or to prevent their possible melting in the process of handling, I coat the outside surface with a hard candy, chocolate, or other edible material 24 of any desired thickness and consistency that will preserve the cuts in a frozen state while being served and consumed and, if desired, may leave the upper face of the cuts free from coating to afford easier biting into the cone. The coating process can, of course, be accomplished in different ways, the simplest manner being to prepare a shell of the hard candy, or chocolate and set the shell in a metal or plastic form and pour the ice cream either in liquid or semi liquid, or other convenient form, and allow then their being frozen and ready to be served.

Moreover, instead of using the conventional cone shaped edible container, the frozen confection may consist of a tubular or oval shaped edible container, 25, made preferably of a flour base, and of the wafer, biscuit, hard cake, or sponge cake varieties, and of any desired and suitable length and thickness. 26 represents a correspondingly readily prepared frozen bar of ice cream, sherbet and the like, and is of a smaller size than the orifice of the cake container and adapted to slide into said edible container. In this instance, too, the frozen bar may be of the same consistency throughout, or may be enveloped with a shell made of hard candy, or chocolate 27, or by dipping process, as described above, that will prevent the frozen bar from melting before being consumed. Here, too, like the coned shaped edible, the container may have ringed projections and recesses, 28 and 29, and in such proximity to each other that regardless of the portion of the confection bitten off, it will tend to break horizontally, and adjacent the recesses, and so prevent any melted portion of the ice cream from soiling any contacting surface. If desired to designate breaking areas of certain portions of the bar, spaced areas 30 may be provided at given intervals, and the spaced areas provided further with recesses 31 to determine further desired breaking surfaces on the ice cream bar.

32 represents a resting surface made of any desired shape and contour, depending on the size and shape of the ice cream bar, adapting the confection to rest vertically on a surface, say a table, thereby permitting the bar to be consumed leisurely, without the necessity of holding the bar until consumed. If no resting surface is used, the bar may terminate with one close end so as to prevent the spilling of any melted ice cream.

If further desired, both ends of the bar may be open, as at 33 and 33', in which event an independent cup member 34, made say of paper or other flexible material, may be used to envelope one of the open ends, with the holding member having a flap extension 35 to adapt the ready lifting off the cup members from a pile before being used in connection with the ice cream bar.

To provide a convenient way of packing the ice cream cuts before being inserted into the edible containers, the deck 36 has openings 37 to permit said ice cream cuts to extend therethrough and to rest on a bottom 38 of the packing container. To prevent the ice cream cuts from sticking to the deck or to the bottom, I provide suspension points, or ribs 39, on the walls of the deck and projections 40 on the bottoms 38. Each deck and bottom may form a section of the packing container and may be superimposed upon each other, in order to hold a number of the ice cream cuts in a limited space.

To prevent the accidental breaking of the edilble container when inserting the ice cream cuts, I provide a semiautomatic device to permit the ready insertion of the ice cream cut into the container.

Accordingly, 41 represents a stand made of metal or other suitable material affording sturdiness of structure, having a base 42 with upwardly extending wall extensions 43 and 43', with a clearing surface 44 in between the wall extensions to house loosely the base 32 of the ice cream confection 25. An upwardly extending wall extension 45 connects the base 42 with the upper main body 46, and affords ample space on each side for gripping the walls of the edible container, as when inserting the container into the device and lifting it out of the device in the handling of the ice cream confection. 47 represents a three side wall closure, adapting to hold the container securely when inserting the ice cream cut. 48 represents a sliding upwardly and downwardly door panel within the grooves 49 and 49' located on the side extensions 50 and 50' of the main body 47. The stops 51 and 51' prevent the door panel from falling out of the grooves, while the pivots 52 and 52' permit the door panel to fall back upon the main body 47, as at 53 when the door panel is raised upwardly and up to the pivots. 54 represents a gripping handle to permit the sliding of the door panel within the grooves. 55 is a resilient pad made of live rubber or other suitable material, with a suitable cover 56 that permits the resting of the ice cream confection during the process of inserting the ice cream cut into the edible container. 57 represents outwardly flared top wall extensions to permit a wider orifice for the insertion of the ice cream cut into the loading device.

In practice, the edible container 25 is picked out of the deck 58 of a container holding a number of edible containers, that may be packed conveniently in a staggered position, as 59 and 60 to save space, and is then inserted into the loading device, with the door panel raised and in an inclined position, as 53, thereby leaving the longitudinal height of the loading device open for the reception of the length of the edible container. The inclined position of the loading device 61 will permit the edible container to stay in place when so inserted into the loading device. The protruding ice cream cut upper end is then lifted out of the deck 36 through the opening 39, that is accomplished with ease because the suspension points 39 prevent the ice cream cut from sticking to the walls of the deck, and is inserted through the open flared orifice 57 of the loading device, with the front door panel resting in the grooves 49 and 49', when it will fall by gravity to the bottom of the edilble container. The door panel is then lifted upwardly and made to fall back on the upper wall end of the loading device. The ice cream confection can then be readily and easily removed from the loading device for consumption purposes. The resilient member will prevent the edible container from breaking when the ice cream cut is permitted to fall into it, while the flared upper orifice will permit the ready insertion of the ice cream cut into the edible container, and the upper four wall closure of the loading device will cause the ice cream cut to slide into the edible container.

If desired, for sanitary purposes, the paper cover member may be slipped over the edible container before handling, and a paper strip, not shown, may be used to cover the ice cream cut before lifting it out from the deck, thereby preventing the hands of the user from touching either the container or its filling.

If desired, a series of loading devices may be placed next to each other, and having either a common base or not, thereby permitting a number of ice cream confections to be made ready for serving at one time.

It is understood that I may resort to such minor changes in the construction and preparation of my ice cream confection and its loading device to permit the most efficient operation, provided I do not depart from the spirit of the invention as herein described.

I claim:

1. As an article of manufacture, an edible farinaceous container for dispensing ice cream and the like, comprising a shell having a multiplicity of closely spaced, horizontally disposed projections on its outer surface substantially throughout its height; said projections being formed by recesses to weaken the shell and to limit vertical splitting and breakage as the container is consumed.

2. An article of manufacture, as set forth in claim 1 wherein said edible farinaceous container is in the form of an ice cream cone, and wherein the outer wall of the cone has recesses extending across said horizontally disposed projections and providing weakened, vertically extending areas to limit breakage of the cone in a horizontal direction.

References Cited in the file of this patent

UNITED STATES PATENTS

| Number | Name | Date |
|---|---|---|
| 1,404,539 | Nelson | Jan. 24, 1922 |
| 1,436,754 | Chadwick | Nov. 28, 1922 |
| 1,509,194 | Dresser | Sept. 23, 1924 |
| 1,987,993 | Dicker | Jan. 15, 1935 |
| 1,992,712 | Mojonnier | Feb. 26, 1935 |
| 2,045,730 | Schepman et al. | June 30, 1936 |
| 2,167,353 | Frediani | July 25, 1939 |
| 2,288,970 | Weisbender | July 7, 1942 |
| 2,489,129 | Harrison | Nov. 22, 1949 |